United States Patent [19]
Sidorenko et al.

[11] 4,223,580
[45] Sep. 23, 1980

[54] ROTARY CUTTING TOOL

[76] Inventors: Valery A. Sidorenko, Leninsky prospekt, 14, kv. 3; Evgeny I. Morgunsky, ulitsa Malaya, 15, kv. 1; Vladimir A. Plotnikov, ulitsa Gikalo, 28, kv. 17; Nikolai V. Vishnev, ulitsa Karastoyanovoi, 23, kv. 82; Petr I. Yascheritsyn, Leninsky prospekt, 18, kv. 102, all of Minsk, U.S.S.R.

[21] Appl. No.: 943,650

[22] Filed: Sep. 19, 1978

[51] Int. Cl.³ .................... B23B 25/02; B23B 27/12
[52] U.S. Cl. .................... 82/36 R; 82/34 R; 407/6; 407/7
[58] Field of Search .................... 82/34 R, 36; 407/7, 407/6, 5, 4, 3, 2; 29/DIG. 52

[56] References Cited
FOREIGN PATENT DOCUMENTS

| 352816 | 5/1922 | Fed. Rep. of Germany | 407/6 |
| 525500 | 2/1975 | U.S.S.R. | 407/7 |
| 575176 | 10/1977 | U.S.S.R. | 407/7 |

Primary Examiner—Leonidas Vlachos
Attorney, Agent, or Firm—Robert E. Burns; Emmanuel J. Lobato; Bruce L. Adams

[57] ABSTRACT

The herein-proposed cutting tool comprises a spindle carrying the cutting element shaped as a solid of revolution, and a chip-breaker knife which, according to the invention is made likewise as a solid of revolution and set on the spindle rotatably round its geometrical axis so as to provide a clearance in between the knife blade and the surface of the workpiece being machined.

6 Claims, 7 Drawing Figures

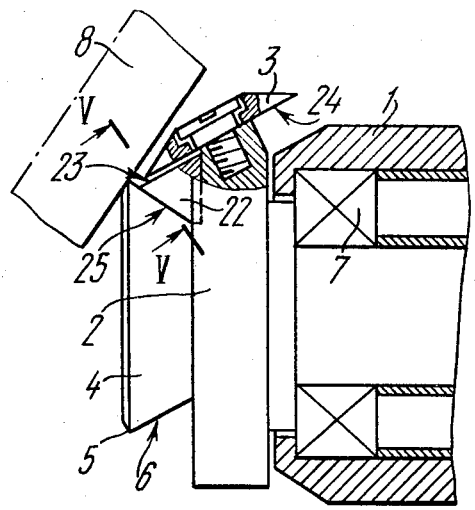
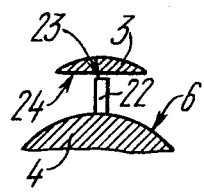
FIG. 4　　　FIG. 5
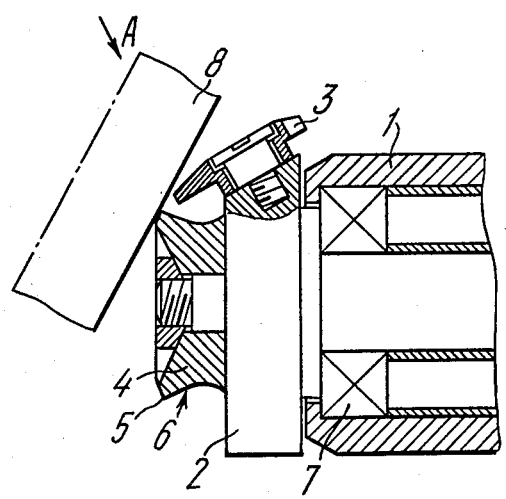
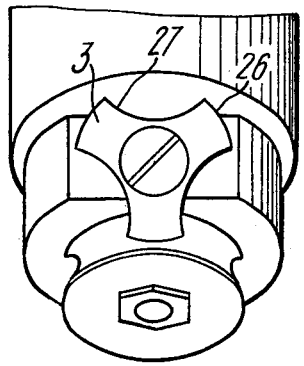
FIG. 6　　　FIG. 7

ROTARY CUTTING TOOL

BACKGROUND OF THE INVENTION

The present invention relates generally to metal working and more specifically to rotary cutting tools.

The invention can find most utility when applied for machining both outside and inside cylindrical surfaces, as well as intricately shaped surfaces and planes of workpieces made from hard-to-machine ductile metals characterized by formation of continuous chips.

An indispensable prerequisite for practical realization of the process of rotary cutting featured by high machining speeds, is a successful solution of the chip breaking problem. The heretofore known chip breaking methods applied in rotary cutting can be classified into two groups. There belongs to the first group of methods the method of making notches, grooves or checks on the tool cutting face; said method though capable of stable chip breaking is, however, subjected to some disadvantages. First the provision of notches, grooves, and the like reduces the number of feasible tool regrindings and hence its total service life; secondly, discontinuity of the cutting blade impairs the quality of surface finish.

Provision of attached stationary knives for chip breaking within the zone of the chip contact with the tool face is instrumental in chip breaking; however, interaction of the chip with the cutting element and the attached stationary knife results in heavy impact loads imposed upon the both of them at the place of their contact with the chip, so that cyclic stresses are liable to arise on the cutting blades thereof, eventuating in their premature wear and chipping-off which to a great extent affects adversely tool endurance and the quality of machined surface finish.

There pertains to the second group of chip-breaking methods the one providing for chip thickness variation in the course of metal cutting process by virtue of an eccentric tool cutting lip. When cutting with such tools their top (i.e., the point on the cutting lip corresponding to a maximum depth of tool penetration into the material being machined) which imparts the final shape to the machined surface, is displaced with respect to the workpiece axis, and chip breaking occurs due to radial runout of the eccentric tool cutting lip.

The result is an altered actual cutting depth and affected quality and accuracy of machining.

One more rotary cutting tool is known to comprise the body accommodating the spindle carrying the cutting element shaped as a solid of revolution, viz., cup-shaped, and the chip breaker knife.

The knife is set in the spindle bore and held by a nut. The knife blade is located as close as possible to the taper face of the cutting element and is spaced apart from the cutting lip thereof at a distance not exceeding the zone of chip contact with the tool surface.

The knife is made as an L-shaped member tightly forced against the taper flank of the cutting element.

When the spindle is running the cutting element removes the chip and the knife, in turn, periodically cuts the chip into portions.

A disadvantage inherent in the above tool construction resides in the fact that impact loads cause high cyclic stresses, whereby the cutting lips of both the cutting element and the chip breaker knife are liable to badly crumble out at the points of their contact.

As a result, the endurance of the cutting element and the chip breaker knife is adversely affected and the quality of surface finish is impaired.

SUMMARY OF THE INVENTION

It is a principal object of the present invention to provide a rotary cutting tool that features high endurance.

It is another object of the present invention to provide a rotary cutting tool that would produce high-quality machined surface finish.

It is one more object of the present invention to provide a rotary cutting tool that would feature a longer service life as compared to the known tools of the same type.

In keeping with the aforesaid and other objects the essence of the present invention resides in that a rotary cutting tool comprises: a body; a spindle housed in said body; a cutting element made as a solid of revolution and set on said spindle; and a chip breaker knife which, according to the invention is shaped as a solid of revolution and is set on said spindle rotatably round its geometric axis in such a manner that a clear space is left in between the knife blade and the surface of the workpiece being machined.

The herein-proposed rotary cutting tool incorporating the chip breaker knife made as a solid of revolution and set on the spindle rotatably round its own geometrical axis, enables one to diminish impact loads upon the cutting lips of both the knife and the cutting element, which involves higher tool endurance and better quality of machined surface finish.

It is expedient that the knife be mounted on a spindle built up by two portions arranged eccentrically with respect to each other.

Setting of the knife on the spindle through the agency of a mandrel enables one to adjust the clearance between the knife blade and the face of the cutting element to suit the depth of the tool impression and, hence, the thickness of the chip removed.

In addition, the provision of an eccentrically positioned mandrel makes it possible to prolong the service life of the cutting element due to an increased number of tool regrindings.

The proposed rotary cutting tool may be so implemented that the chip breaker knife be set on the spindle through the agency of a ring held to the eccentrical spindle portion.

Such an arrangement of the knife is also instrumental in adjusting the clearance between the knife blade and the face of the cutting element and providing a relatively great number of tool regrindings which adds much to a total tool service life.

This embodiment is advantageous over the preceding one, this being due to the fact that the ring enables one to provide larger amount of eccentricity, thus greatly increasing the number of the cutting element regrindings which eventually prolongs the service life thereof.

According to a further embodiment of the invention the knife may also be set on the spindle through the agency of a shaft journalled in bearings and linked to the spindle through a roller held to the shaft, said roller being in essence the planet pinion of a planetary gearing, wherein used as the sun wheel is a flange made fast on the tool body.

The aim of such a constructional arrangement is to prevent the knife from being jammed and thus add to the endurance of both the knife and the cutting element.

It is expedient that the bearings be accommodated in an eccentric bushing located in the spindle.

Accommodation of the bearings in an eccentric bushing makes it possible to adjust the clearance between the knife and the face of the cutting element and increase the number of regrindings of the latter which likewise extends tool service life.

It is also practicable that provision may be made in the proposed rotary cutting tool for a component part held to the spindle and so shaped that one of the surfaces thereof is located as close as possible to the knife side surface, while its other surface is in permanent contact with the face of the cutting element.

The aforesaid component part and its being located on the spindle make it possible to prevent chips from getting into the space confined between the face of the cutting element and the knife end face and hence to avoid knife jamming and thus increase efficiency of the chip breaking process, as well as to add to the endurance of both the knife and the cutting element.

It is with a view to simplifying the setting-up procedure and increasing the efficiency of the chip breaking process and the endurance of the tool that the knife blade is expedient to have a regularly repeating profile.

It is most advantageous for the tool construction when the regularly repeating profile of the knife blade is a star-shaped one, as such a shape rules out knife jamming and knife regrinding can be dispensed with as chips are broken rather than cut off. In addition, the chip breaking process occurs outside the cutting zone, whereby setting up of the tool is rendered easier, its endurance is increased and chip breaking efficiency is made higher.

BRIEF DESCRIPTION OF THE DRAWINGS

In what follows the present invention is illustrated by a detailed description of a specific embodiment thereof and the accompanying drawings, wherein:

FIG. 4 is a general longitudinal section, partly cut-away view of a rotary cutting tool showing the chip-breaker knife and a component part adapted to prevent chips from getting into the space confined within the face of the cutting element and the end face of the chip-breaker knife, according to the invention;

FIG. 5 is a section taken along the section line V—V in FIG. 4;

FIG. 6 is a general longitudinal section, fragmentarily cut-away view of a rotary cutting tool showing the chip-breaker knife whose blade has a star-shaped contour, according to the invention; and FIG. 7 is a view of the knife blade as taken along the arrow A in FIG. 6.

DESCRIPTION OF THE PREFERRED EMBODIMENTS

Figure 1:
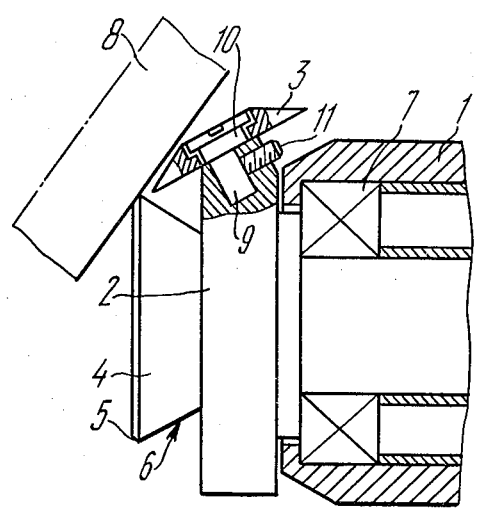
FIG. 1 is a general longitudinal section, fragmentarily cut-away view of a rotary cutting tool showing the chip-breaker knife set on the spindle through the agency of a mandrel, according to the invention.

Referring now to the accompanying drawings, proposed herein is a rotary cutting tool as illustrated in FIG. 1, whose body 1 accommodates a spindle 2 carrying a cutting element shaped as a solid of revolution, and a chip breaker knife 3.

Used as a solid of revolution in this particular case is a cup 4 having a circular lip 5 and a taper side surface 6. The spindle 2 is journalled in bearings 7 inside the body 1.

According to the invention, the chip breaker knife 3 is shaped as a solid of revolution and is set on the spindle 2 rotatably round its geometrical axis in such manner that a clear space is left in between the knife 3 and the surface of a workpiece 8 being machined. This is conducive to lower impacts loads upon the cutting lips of both the knife and the cutting element and hence to lower stresses therein.

As different-thickness chips are to be removed in the course machining, the clearance between the knife blade and the face of the cutting element is made adjustable.

Adjustment of said clearance can be done by a number of ways. Thus, the knife 3 can be set on the spindle 2 through the agency of a mandrel made up by two portions 9 and 10 arranged eccentrically relative to each other, the portion 9 being fixed in position in the spindle 2 through a screw 11, and the knife 3 is rotatably mounted on the portion 10.

Figure 2:
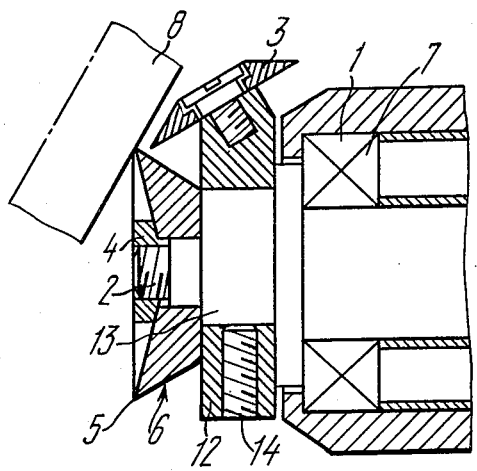
FIG. 2 is a general longitudinal section view of a rotary cutting tool showing the chip-breaker knife set on the spindle through the agency of a ring, according to the invention.

FIG. 2 shows the chip breaker knife 3 set on the spindle through the agency of a ring 12 which is mounted on an eccentric portion 13 of the spindle 2 through the use of screws 14.

Figure 3:
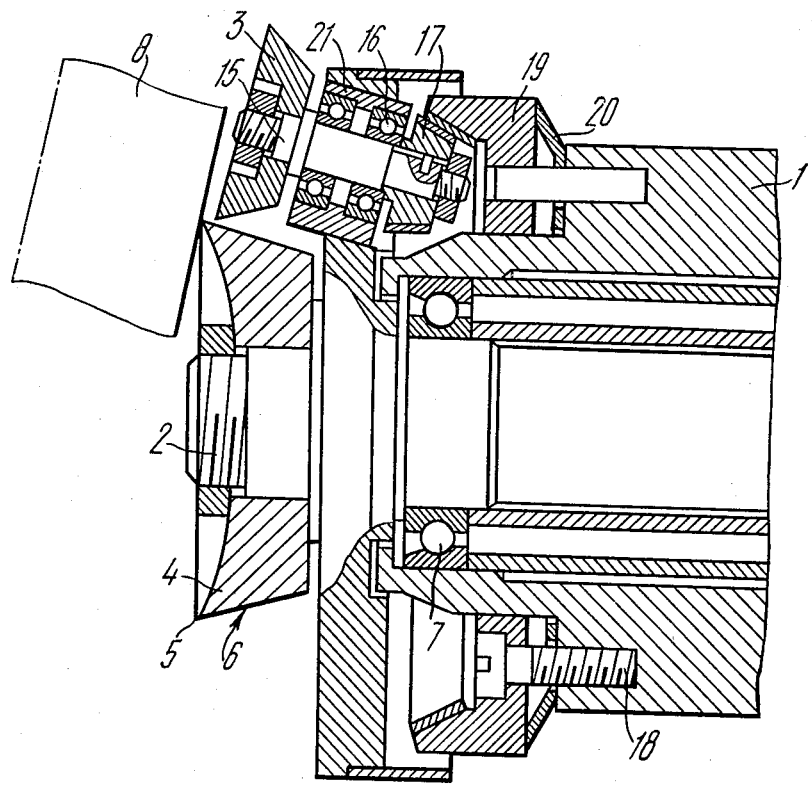
FIG. 3 is a general longitudinal section view of a rotary cutting tool showing the chip-breaker knife journalled in bearings and kinematically linked to the spindle through the agency of a planetary gearing, according to the invention.

FIG. 3 illustrates the chip breaker knife 3 set on the spindle 2 through the agency of a shaft 15 journalled in bearings 16, while the other end of the shaft 15 carries a roller 17 which is in effect the planet pinion of a planetary gearing. A flange 19 loaded by a spring 20 is bolted to the body 1, said flange being adapted to serve as the sun wheel in said planetary gearing.

The bearings 16 are accommodated in an eccentric bushing 21 located in the spindle 2.

Provision can be made in the herein-proposed rotary cutting tool for a component part 22 (FIGS. 4,5) secured on the spindle 2 and made so that its surface 23 is located as close as possible to a side surface 24 of the knife 3, whereas the other surface 25 is in permanent contact with the face 6 of the cutting element 4.

Provision of the component part 22 prevents the knife 3 from getting jammed.

FIGS. 6 and 7 represent a rotary cutting tool, wherein the blade of the knife 3 has a regularly repeating profile made as, say, alternating projections 26 (lugs) and depressions 27 (circular gashes), or star-shaped, single-lug, double-lug, etc.

The rotary cutting tool of the present invention operates as follows.

Once the machine, wherein use is made of the proposed tool, has been started, the tool is approached to the workpiece 8 being machined and a trial pass is performed, whereupon a required cutting depth is set against the respective vernier and power feed motion is engaged to make a working pass. When the machine is operating rotation from the workpiece 8 is imparted to the tool, whereby the cutting element 4 (FIG. 1) receives rotation from the workpiece 8 being machined and removes the chip with its cutting lip 5. The chips flow along the side taper surface 6 of the cutting element 4, and the knife 3 gets in contact with the chips to break the latter and at the same time rotates round its geometric axis.

When the taper face 6 of the cutting element 4 is resharpened the clearance between the face 6 and the blade of the knife 3 increases.

To compensate for wear and restore the required amount of said clearance the eccentric mandrel 9, 10 (FIG. 1) is turned or the ring 12 (FIG. 2) is rotated relative to the eccentrical portion 13 of the spindle 2.

Provision of the additional component part 22 (FIG. 4) held to the spindle 2 prevents the chips from getting between the taper face 6 of the cutting element 4 and the side surface 24 of the knife 3 to avoid jamming of the latter.

The spindle 2 (FIG. 3) along with the cutting element 4 and the knife 3 performs rotary motion in the course of the cutting process. As a result, the roller 17 held in position to the shaft 15 which carries also the knife 3, interacts with the flange 19 to ride thereover, i.e., the knife 3 is imparted compound motion, viz., planetary motion round the tool axis and positive rotation round its own axis. The positive rotation of the knife 3 enables its jamming to be precluded.

The spring 20 put in between the flange 19 and the tool body 1 provides for a stable contact between the roller 17 and the flange 19.

Turning of the eccentric bushing 21 in the bore of the spindle 2 changes the distance between the knife axis and the tool axis, i.e., the clearance between the blade of the knife 3 and the taper face 6 of the cutting element 4.

Just as the chip-breaker knife 3 gets in contact with the chips removed by the cutting element 4 (FIG. 6), the knife turns round its own axis, while the chips flow down along the taper face 6 of the cutting element 4. It is by virtue of rotation of the spindle 2 together with the cutting element 4 and the knife 3 that the latter catches up the chip outside the zone of cutting strikes fiercely thereagainst, thereby breaking it into pieces. At the moment when one of the lugs 26 of the chip-breaker knife 3 assumes the position above the front surface 6 of the cutting element 4, the chip pieces getting into the space between the latter and the knife 3 have no time to jam the latter as at the next moment the knife depression 27 stands over the face 6 of the cutting element 4. The broken chip pieces being not opposed by the chip-breaker knife 3, they are thrown, by virtue of centrifugal force, off the face 6 of the cutting element 4.

Thanks to the fact that the chip is broken mostly by the side surfaces of the depression 27 it is no longer necessary to strictly maintain the amount of clearance between the knife and the face of the cutting element which simplifies tool setting-up.

What is claimed is:

1. A rotary cutting tool comprising, a body, a driven spindle in said body, a cutting element on a leading end of said spindle shaped as a solid of revolution, a chip breaker knife made as a solid of revolution, means on said spindle having an axis rotatably mounting said chip breaker knife for rotation about said axis, said axis being disposed at an angle relative to a longitudinal axis of said spindle, and said chip breaker knife having a cutting edge disposed adjacent a cutting edge of said cutting element but spaced therefrom and from a workpiece being machined by said cutting element to allow chips to fall therebetween.

2. A rotary cutting tool according to claim 1, in which the cutting element has a peripheral cutting edge and the cutting edge of said chip breaker knife is disposed radially of said spindle and in the vicinity of the peripheral cutting edge of said cutting element.

3. A rotary cutting tool according to claim 1, in which said first-mentioned axis is in a plane intersecting said longitudinal axis at an angle less than ninety degrees.

4. A rotary cutting tool according to claim 1, in which said cutting edge of said cutting tool comprises a peripheral cutting edge, and in which said chip breaker knife has a repeating profile.

5. A rotary cutting tool according to claim 4, in which said repeating profile is star-shaped.

6. A rotary cutting tool according to claim 1, including means to variably eccentrically adjust said chip breaker knife relative to the first-mentioned axis thereby to variably position said cutting edge of the chip breaker knife relative to the cutting edge of the cutting tool and compensate for wear on said cutting edge of said cutting element.

* * * * *